US012775408B2

(12) United States Patent
Mitsumasu et al.

(10) Patent No.: US 12,775,408 B2
(45) Date of Patent: Oct. 27, 2026

(54) MEMORY SYSTEM

(71) Applicant: Kioxia Corporation, Tokyo (JP)

(72) Inventors: Yosuke Mitsumasu, Hadano (JP); Ryoichi Kato, Yokohama (JP)

(73) Assignee: Kioxia Corporation, Tokyo (JP)

(*) Notice: Subject to any disclaimer, the term of this patent is extended or adjusted under 35 U.S.C. 154(b) by 0 days.

(21) Appl. No.: 18/983,843

(22) Filed: Dec. 17, 2024

(65) Prior Publication Data

US 2025/0224895 A1 Jul. 10, 2025

(30) Foreign Application Priority Data

Jan. 10, 2024 (JP) ................................ 2024-001843

(51) Int. Cl.
*G06F 3/06* (2006.01)

(52) U.S. Cl.
CPC ............ *G06F 3/064* (2013.01); *G06F 3/0604* (2013.01); *G06F 3/0652* (2013.01); *G06F 3/0659* (2013.01); *G06F 3/0679* (2013.01)

(58) Field of Classification Search
CPC ...... G06F 3/064; G06F 3/0604; G06F 3/0652; G06F 3/0659; G06F 3/0679
USPC ........................................................ 711/154
See application file for complete search history.

(56) References Cited

U.S. PATENT DOCUMENTS

| | | | | |
|---|---|---|---|---|
| 2016/0291872 | A1* | 10/2016 | Hashimoto | G06F 3/061 |
| 2016/0313943 | A1* | 10/2016 | Hashimoto | G06F 3/061 |
| 2018/0276113 | A1 | 9/2018 | Navon | |
| 2019/0146679 | A1 | 5/2019 | Doh | |
| 2020/0326884 | A1 | 10/2020 | Hu | |
| 2021/0064290 | A1* | 3/2021 | Kanno | G06F 3/0604 |
| 2021/0182202 | A1 | 6/2021 | Jin | |
| 2021/0223998 | A1 | 7/2021 | Li et al. | |
| 2023/0367498 | A1* | 11/2023 | Gunda | G06F 3/0604 |

FOREIGN PATENT DOCUMENTS

| | | | |
|---|---|---|---|
| CN | 108628763 | A | 10/2018 |
| CN | 109800177 | A | 5/2019 |
| CN | 112988044 | A | 6/2021 |

* cited by examiner

*Primary Examiner* — Jared I Rutz
*Assistant Examiner* — Wei Ma
(74) *Attorney, Agent, or Firm* — Kim & Stewart LLP

(57) ABSTRACT

A memory system includes a nonvolatile memory including a plurality of blocks, and a controller. The controller manages a plurality of streams and allocates a first erased block for which a data erase operation has been completed among the plurality of blocks as a general-purpose block. In a case where use of a first stream among the plurality of streams is started, if two or more erased blocks for which the data erase operation has been completed are included in the plurality of blocks, the controller allocates a second erased block as the write destination block corresponding to the first stream, and if two or more erased blocks for which the data erase operation has been completed are not included in the plurality of blocks, sets the first erased block as the write destination block.

18 Claims, 12 Drawing Sheets

MEMORY SYSTEM

CROSS-REFERENCE TO RELATED APPLICATION(S)

This application is based upon and claims the benefit of priority from Japanese Patent Application No. 2024-001843, filed Jan. 10, 2024, the entire contents of which are incorporated herein by reference.

FIELD

Embodiments described herein relate generally to a technique for controlling a nonvolatile memory.

BACKGROUND

In recent years, memory systems including a nonvolatile memory have been widely used. As one type of such memory systems, a solid-state drive (SSD) including a NAND flash memory is known. The SSD is used as a main storage for various computing devices.

The memory system may have a multi-stream function. The multi-stream function is a function of receiving, from a host, a write request associated with one stream among a plurality of streams and writing data associated with the write request into a block in a nonvolatile memory allocated to the one stream. The plurality of streams are used to, for example, distinguish among pieces of data with different lifetimes and write them into different blocks.

In a case where a stream use is started, a block for which a data erase operation has completed is allocated to the stream.

However, in some cases, sufficient number of erased blocks are not secured when the use of one or more streams has started. In a case where allocation of the erased blocks to these streams is delayed, execution of a process according to a write request associated with these streams is delayed.

DETAILED DESCRIPTION

One or more embodiments provide a memory system that can reduce delay of a process according to a write request.

In general, according to one embodiment, a memory system is connectable to a host. The memory system includes a nonvolatile memory and a controller. The nonvolatile memory includes a plurality of blocks. The controller is electrically connected to the nonvolatile memory. The controller manages a plurality of streams. The controller allocates a first erased block for which a data erase operation has been completed among the plurality of blocks, as a general-purpose block into which data not associated with any of the plurality of streams and data associated with any of the plurality of streams are writable. In a case where use of a first stream among the plurality of streams is started, if two or more erased blocks for which the data erase operation has been completed are included in the plurality of blocks, the controller allocates a second erased block as a write destination block corresponding to the first stream, and if two or more erased blocks for which the data erase operation has been completed are not included in the plurality of blocks, the controller sets the first erased block as the write destination block corresponding to the first stream.

Various embodiments will be described hereinafter with reference to the accompanying drawings.

Figure 1:
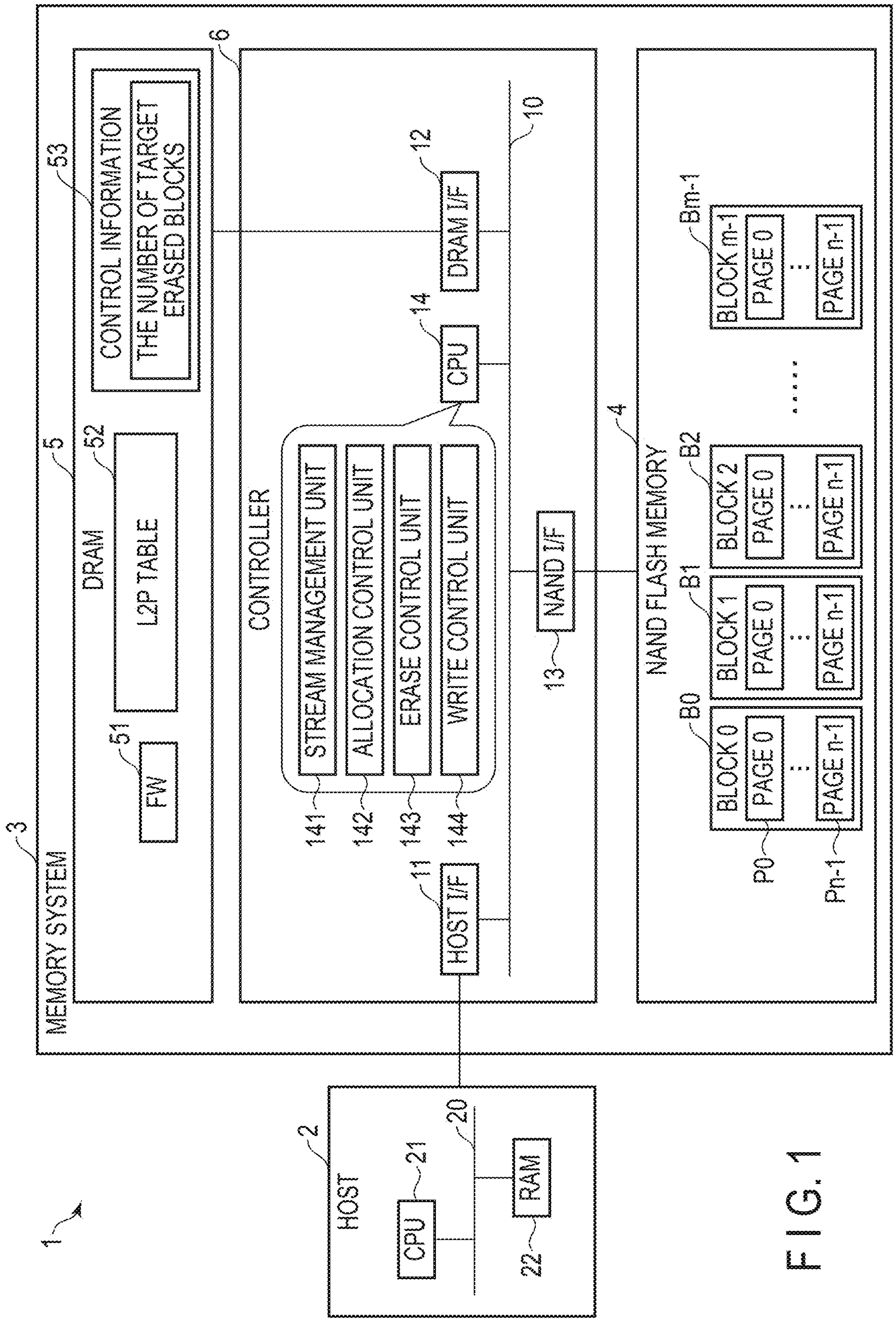
FIG. 1 is a block diagram illustrating a configuration example of an information processing system including a memory system according to an embodiment.

First, a configuration of an information processing system 1 that includes a memory system according to an embodiment will be described with reference to FIG. 1. The information processing system 1 includes a host device 2 and a memory system 3.

The host device 2 may be a storage server that stores a large amount of various data in the memory system 3, or may be a personal computer. Hereinafter, the host device 2 is also referred to as a host 2.

The memory system 3 is a storage device configured to write data into a nonvolatile memory and read data from the nonvolatile memory. The nonvolatile memory is, for example, a NAND flash memory 4. The memory system 3 is also referred to as a storage device or a semiconductor storage device. The memory system 3 is, for example, an SSD including the NAND flash memory 4. Hereinafter, a case where the nonvolatile memory is the NAND flash memory 4 will be mainly explained.

The memory system 3 has a multi-stream function. The multi-stream function is a function of receiving, from outside (here, the host 2), a write request associated with one stream among a plurality of streams and writing user data associated with the write request into a block in the NAND flash memory 4 allocated to the one stream. The plurality of streams are used to, for example, distinguish among pieces of user data with different lifetimes and write them into different blocks. More specifically, the expression "receiving a write request associated with a stream" means receiving a write request with a specified stream. The write request is, for example, a write command. The write request may include information (e.g., stream ID) by which a stream is uniquely identifiable. Hereinafter, it is assumed that the write request is the write command. In some embodiments, zones or reclaim units may be used instead of streams.

The memory system 3 may be used as a storage of the host 2. The memory system 3 may be provided inside the host 2 or may be connected to the host 2 via a cable or a network.

An interface for connecting the host 2 and the memory system 3 conforms to standards such as PCI Express™ (PCIe™), Ethernet™, Fibre channel, and NVM Express™ (NVMe™).

The host 2 includes, for example, a central processing unit (CPU) 21, and a random access memory (RAM) 22. The CPU 21 and the RAM 22 are connected via a bus 20, for example.

The CPU 21 includes, for example, at least one processor. The CPU 21 controls operations of various components in the host 2.

The RAM 22 is, for example, a volatile memory. The RAM 22 is, for example, a dynamic random access memory (DRAM) or a static random access memory (SRAM).

The memory system 3 includes, for example, the NAND flash memory 4, a DRAM 5, and a controller 6.

The NAND flash memory 4 includes a plurality of blocks B0, B1, B2, . . . , and Bm-1. The plurality of blocks B0, B1, B2, . . . , and Bm-1 each function as a minimum unit of a data erase operation. The block may also be referred to as an erase block or a physical block. Each of the plurality of blocks B0, B1, B2, . . . , and Bm-1 includes a plurality of pages P0, . . . , and Pn-1. Each of the plurality of pages P0, . . . , and Pn-1 includes a plurality of memory cells connected to a single word line. The plurality of pages P0, . . . , and Pn-1 each function as a unit of a data write operation and a data read operation. Note that a word line may also function as a unit of a data write operation and a data read operation.

The maximum number of program/erase cycles (the number of P/E cycles) for each of the blocks is limited, and is referred to as the maximum number of P/E cycles. One P/E cycle of a certain block includes a data erase operation to erase data stored in all memory cells in the block and a program operation to write data into each page of the block.

The DRAM 5 is a volatile memory. A memory area of the DRAM 5 is allocated, for example, as a storage area of firmware (FW) 51, a cache area of a logical-to-physical address translation table 52 (hereinafter, referred to as an L2P table 52), and a storage area of control information 53. The control information 53 includes, for example, the number of target erased blocks. The memory area of the DRAM 5 may also be allocated as a buffer area that temporarily stores user data.

The FW 51 is a program for controlling the operation of the controller 6. The FW 51 is loaded from the NAND flash memory 4 to the DRAM 5, for example.

The L2P table 52 is a table for managing mapping between each logical address and each physical address. The logical address is an address used by the host 2 for addressing a memory area of the memory system 3. The logical address is, for example, a logical block address (LBA).

The number of target erased blocks is data indicating the number of erased blocks to be secured in the NAND flash memory 4. The erased block is a block in which a data erase operation has completed and a program operation has not been performed yet.

The controller 6 may be implemented as a circuit such as a system-on-a-chip (SoC). The controller 6 may be implemented as a plurality of semiconductor chips. The controller 6 is electrically connected to the NAND flash memory 4 and is configured to control the NAND flash memory 4. The function of each unit in the controller 6 may be implemented as dedicated hardware in the controller 6 or may be implemented as a processor executing the FW.

The controller 6 may also function as a flash translation layer (FTL) configured to execute a data management and a block management of the NAND flash memory 4. The data management executed by the FTL includes (1) management of mapping information indicative of relationship between each logical address and each physical address of the NAND flash memory 4, and (2) process to hide a difference between data read operations/data write operations in units of page and data erase operations in units of block. The block management includes management of defective blocks, wear leveling, and garbage collection (GC).

The management of mapping between each logical address and each physical address is executed by using the L2P table 52, for example. The controller 6 uses the L2P table 52 to manage the mapping between each logical address and each physical address with a particular management size. A physical address corresponding to a certain logical address indicates a physical memory location in the NAND flash memory 4 into which data of the logical address is written. The controller 6 manages a plurality of memory areas that are obtained by logically dividing the memory area of the NAND flash memory 4, using the L2P table 52. The size of each of the plurality of memory areas is the above-described management size. The plurality of memory areas correspond to a plurality of logical addresses, respectively. That is, each of the plurality of memory areas is identified by one logical address. The L2P table 52 may be loaded from the NAND flash memory 4 to the DRAM 5 when the memory system 3 is powered on.

Data write into one memory cell is executable only once in a single P/E cycle. Thus, the controller 6 writes update data corresponding to a certain logical address not into a physical memory location in which previous data corresponding to the logical address is stored but into a different physical memory location. Then, the controller 6 updates the L2P table 52 to associate the logical address with the different physical memory location and to invalidate the previous data. Data to which the L2P table 52 refers (that is, data associated with a logical address) is referred to as valid data. Furthermore, data previously but no longer associated with a logical address is referred to as invalid data. The valid data is data that can be read by the host 2 later. The invalid data is data that can no longer be read by the host 2.

The blocks in the NAND flash memory 4 are roughly divided into active blocks and free blocks. The active block is a block in which the valid data is stored and into which new data is not able to be written. The free block is a block in which the valid data is not stored and which is able to be used for writing new data after the data erase operation is performed thereon. That is, the free block is used as a new data write destination block after the data erase operation. The write destination block may store the valid data. The free block becomes an erased block after a data erase operation is completed. Note that the free block during a data erase operation is also referred to herein as a "block during erase."

The GC is a process of copying valid data in some active blocks that store a mixture of valid data and invalid data to another block (for example, an erased block). The block that is left with only invalid data due to the valid data being copied to another block by the GC is released as a free block. Accordingly, the GC makes it possible to increase the number of free blocks in the NAND flash memory 4.

The controller 6 includes, for example, a host interface circuit (host I/F) 11, a DRAM interface circuit (DRAM I/F) 12, a NAND interface circuit (NAND I/F) 13, and a CPU 14. The host I/F 11, DRAM I/F 12, NAND I/F 13, and CPU 14 are connected via, for example, a bus 10.

The host I/F 11 is a circuit configured to receive various commands (for example, I/O commands and various types of control commands), and data from the host 2 and to transmit a response and data corresponding to a command to the host 2. The I/O commands include, for example, a write command and a read command. The control commands include, for example, an unmap command (also referred to as a trim command), an open command, and a close command. The unmap command is a command that requests data invalidation corresponding to a specified logical address (or a logical address range). The open command is a command that requests the use of a stream to start (i.e., opening of a stream). The close command is a command that requests the use of a stream to end (i.e., closing of a stream).

The DRAM I/F 12 is a DRAM control circuit configured to control access to the DRAM 5.

The NAND I/F 13 is a NAND control circuit configured to control the NAND flash memory 4. The NAND I/F 13 may be connected to a plurality of memory chips in the NAND flash memory 4 via a plurality of channels, respectively. Driving the plurality of memory chips in parallel makes it possible to increase the bandwidth of access between the controller 6 and the NAND flash memory 4.

The CPU 14 is a processor configured to control the host I/F 11, the DRAM I/F 12, and the NAND I/F 13. The CPU 14 performs various processes by executing the FW 51 loaded in the DRAM 5 from the NAND flash memory 4. The FW 51 is a control program including instructions for causing the CPU 14 to execute various processes. The CPU 14 can execute command processes for processing various commands from the host 2. The operation of the CPU 14 is controlled by the FW 51 executed by the CPU 14.

The function of each unit in the controller 6 may be executed by dedicated hardware in the controller 6 or may be executed by the CPU 14 executing the FW 51.

The CPU 14 functions as, for example, a stream management unit 141, an allocation control unit 142, an erase control unit 143, and a write control unit 144. The CPU 14 executes, for example, the FW 51 to function as these units.

The stream management unit 141 manages a plurality of streams. Specifically, the stream management unit 141 manages the start of use (opening) and the end of use (closing) of a stream.

In response to reception of a command indicating the start of use of a certain stream from the host 2, the stream management unit 141 sets the stream to an open state. The command indicating the start of use of a stream is, for example, a write command specifying the stream for the first time. Note that as the command indicating the start of use of a stream, an open command specifying the stream may be used. In response to transmission of a response to the open command to the host 2, the stream management unit 141 may set a corresponding stream to an open state. The stream management unit 141 notifies, for example, the allocation control unit 142, of the opening of the stream.

In response to detecting that the close command specifying a certain stream has been received from the host 2 or a write command specifying the certain stream has not been received from the host 2 for a fixed time, the stream management unit 141 sets the stream to a close state. The stream management unit 141 notifies, for example, the allocation control unit 142 of the closing of the stream. Note that, in response to reception of a write command specifying a stream (or the open command specifying a stream) from the host 2 after the stream is set to a close state, the stream management unit 141 sets the stream to the open state again.

The allocation control unit 142 controls the allocation of a general-purpose block and a dedicated block and the setting of a write destination block.

The general-purpose block is a block into which both user data associated with a write command not specifying any stream and user data associated with a write command specifying a stream are writable. The write command not specifying any stream is also referred to herein as a non-stream write command. The user data associated with the non-stream write command is also referred to herein as non-stream user data. The non-stream user data is user data not associated with any stream. The general-purpose block may be used not only as a write destination block of the non-stream user data and but also as a write destination block of the user data associated with a stream.

The dedicated block is a block into which only user data associated with a write command specifying a corresponding stream is writable. The write command specifying a stream is also referred to herein as a stream write command. The user data associated with the stream write command is also referred to herein as stream user data associated with a stream. The dedicated block is used as a write destination block of user data associated with a corresponding stream.

The allocation control unit 142 allocates an erased block in the NAND flash memory 4 as the general-purpose block. The erased block in the NAND flash memory 4 is a block that has not been allocated yet as any of the general-purpose block and the dedicated block. Specifically, the allocation control unit 142 allocates an erased block as the general-purpose block in response to the powering on of the memory system 3, for example. Furthermore, the allocation control unit 142 allocates a new erased block as the general-purpose block in response to the completion of data writing into the entirety of a general-purpose block.

The allocation control unit 142 allocates an erased block in the NAND flash memory 4 as the dedicated block corresponding to a stream in the open state. Specifically, when a stream is opened, the allocation control unit 142 may allocate an erased block as the dedicated block corresponding to the stream. Furthermore, in response to the completion of data writing into the entirety of a dedicated block allocated to a stream, the allocation control unit 142 may allocate a new erased block as the dedicated block corresponding to the stream. Note that when there is no erased block that can be allocated as the dedicated block corresponding to a stream, the allocation control unit 142 sets the general-purpose block as the write destination block of the stream. Furthermore, in response to detecting the closing of a stream, the allocation control unit 142 may change the dedicated block corresponding to the stream to the general-purpose block.

The allocation control unit 142 determines the number of target erased blocks on the basis of the number of streams in the open state. The allocation control unit 142 sets, as the number of target erased blocks, a number obtained by adding 1 to the number of streams in the open state, for example. In this case, the number of target erased blocks corresponds to the sum of (A) the number of erased blocks to be allocated as the dedicated blocks to each stream in the open state and (B) the number of erased blocks to be allocated as the general-purpose blocks.

The erase control unit 143 selects one free block from among one or more free blocks in the NAND flash memory 4 and performs a data erase operation for the selected free block. Specifically, the erase control unit 143 controls the execution of a data erase operation for the free block on the basis of the number of erased blocks included in the NAND flash memory 4 and the number of target erased blocks. The erase control unit 143 performs a data erase operation for a free block while the number of erased blocks included in the NAND flash memory 4 is less than the number of target erased blocks. The erase control unit 143 does not perform a data erase operation for a free block while the number of erased blocks included in the NAND flash memory 4 is equal to or more than the number of target erased blocks.

The write control unit 144 performs a process according to a write command received from the host 2. Specifically, the write control unit 144 performs a process for writing associated user data in the general-purpose block in response to a non-stream write command. The write control unit 144 performs a process for writing associated user data into a write destination block corresponding to a stream according to a stream write command. The write destination block corresponding to the stream is a dedicated block allocated to the stream or the general-purpose block.

Thus, the stream management unit 141, the allocation control unit 142, the erase control unit 143, and the write control unit 144 execute a data write operation corresponding to a multi-stream function. More specific operation examples of the stream management unit 141, the allocation control unit 142, the erase control unit 143, and the write control unit 144 will be described below with reference to FIGS. 5 to 9.

Here, in a memory system according to a comparative example, two cases will be described where the execution of a write command is delayed. The memory system of the comparative example has a multi-stream function. The delay of the execution of the write command occurs due to an insufficient number of erased blocks to be allocated as write destination blocks, for example.

Figure 2:
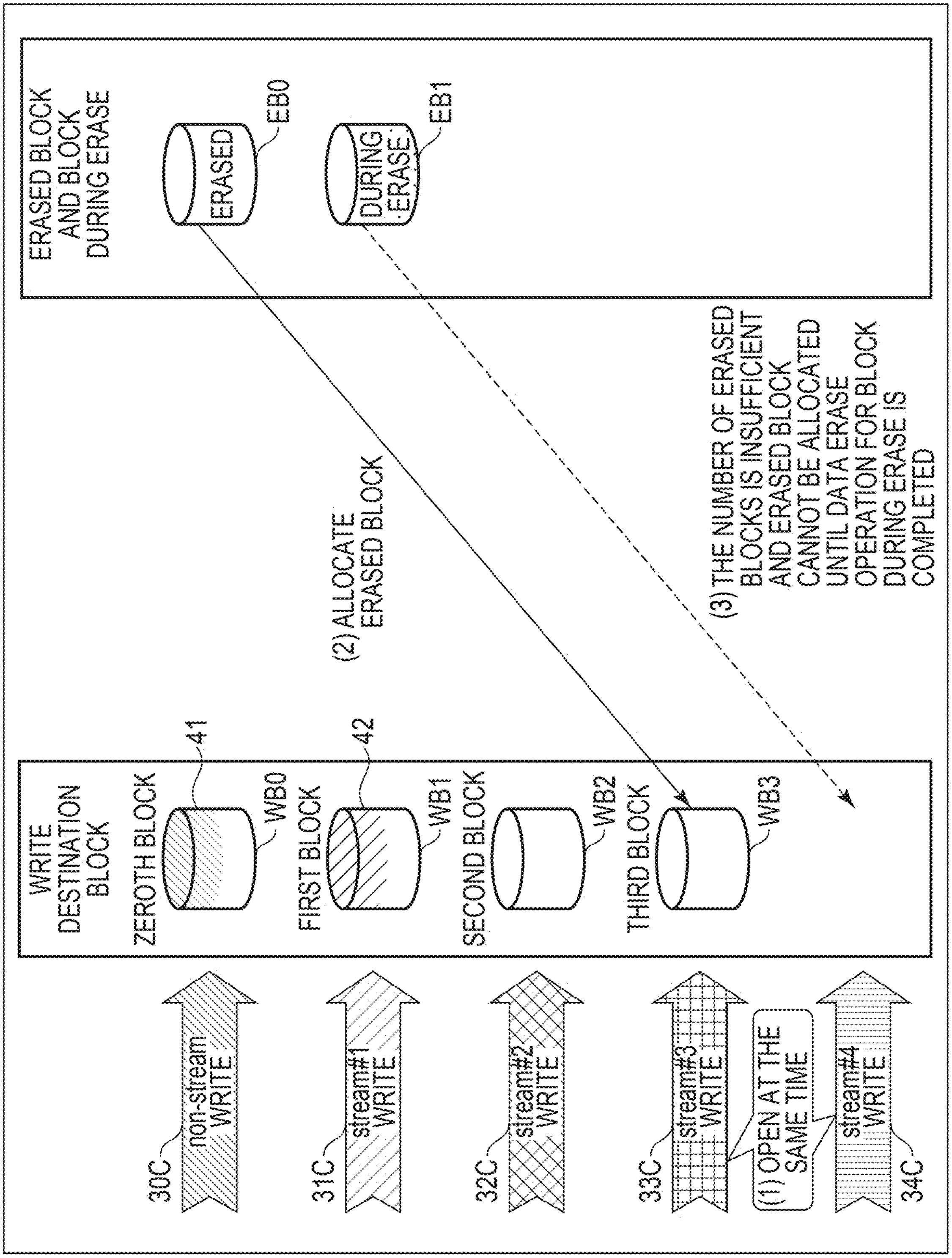
FIG. 2 is a diagram illustrating a case where the number of erased blocks is insufficient when a plurality of streams is opened in a short time period, in a memory system according to a comparative example.

FIG. 2 illustrates a case (hereinafter, referred to as a first case) where the number of erased blocks is insufficient when a plurality of streams is opened in a short time period, in the memory system of the comparative example. In the first case, a zeroth block WB0, a first block WB1, and a second block WB2 are allocated to a non-stream 30C (non-stream), a first stream 31C (stream #1), and a second stream 32C (stream #2), respectively. In the zeroth block WB0, user data 41 of the non-stream 30C is stored. In the first block WB1, user data 42 associated with the first stream 31C is stored. In the second block WB2, no data has been stored yet. Furthermore, in the NAND flash memory, one erased block EB0 and one block during erase EB1 are included.

In the first case, two streams of a third stream 33C and a fourth stream 34C are opened at the same time ((1) in FIG. 2). In response to the opening of the third stream 33C, the erased block EB0 is allocated as the write destination block of the third stream 33C ((2) in FIG. 2).

On the other hand, since an allocable erased block is not secured, in response to the opening of the fourth stream 34C, an erased block cannot be allocated as the write destination block of the fourth stream 34C. The block during erase EB1 cannot be allocated as the erased block EB1 to the fourth stream 34C until the data erase operation therefor is completed ((3) in FIG. 2).

Therefore, in the memory system of the comparative example, in the first case, the execution of the write command specifying the fourth stream 34C is delayed.

Figure 3:
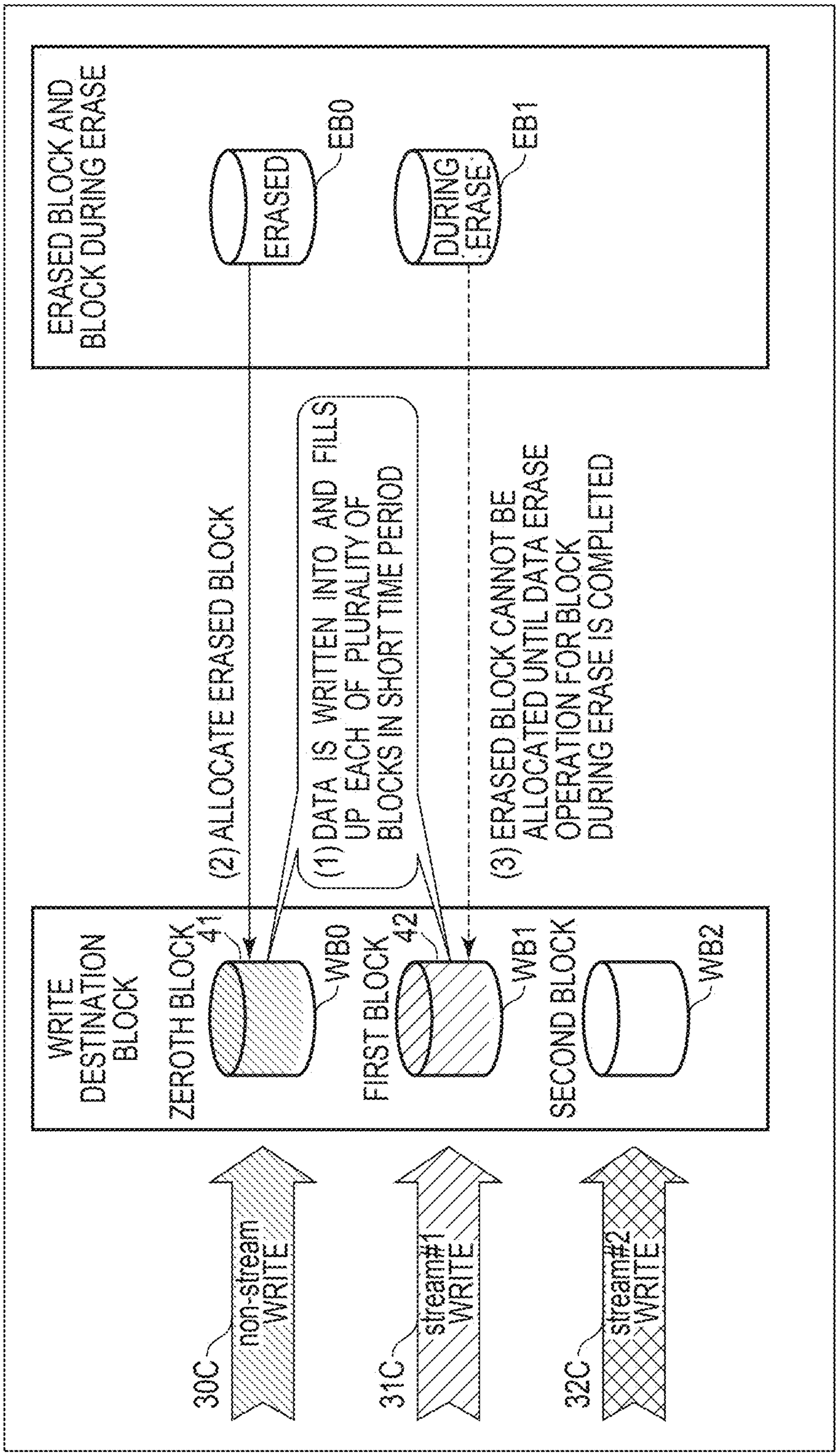
FIG. 3 is a diagram illustrating a case where the number of erased blocks is insufficient when data is written into and fills up each of the plurality of blocks in a short time period, in the memory system according to the comparative example.

FIG. 3 illustrates a case (hereinafter, referred to as a second case) where the number of erased blocks is insufficient when data is written into and fills up each of the plurality of blocks in a short time period, in the memory system of the comparative example. The relationship among the non-stream 30C, the first stream 31C, the second stream 32C, the zeroth block WB0, the first block WB1, the second block WB2, the erased block EB0, and the block during erase EB1 in the second case is similar to that in the first case.

In the second case, data is written into and fills up each of two blocks of the zeroth block WB0 and the first block WB1 in a short time period ((1) in FIG. 3). The erased block EB0 is newly allocated as the write destination block of the non-stream 30C in response to completion of data writing into the entirety of the zeroth block WB0 ((2) in FIG. 3).

On the other hand, since an allocable erased block is not secured, in response to completion of data wiring into the entirety of the first block WB1, an erased block cannot be allocated as the write destination block of the first stream 31C. The block during erase EB1 cannot be allocated as the erased block EB1 the first stream 31C until the data erase operation therefor is completed ((3) in FIG. 3).

Therefore, in the memory system of the comparative example, in the second case, the execution of the write command specifying the first stream 31C is delayed.

Furthermore, in the memory system of the comparative example, the memory area of a block allocated to a stream may be wasted.

Figure 4:
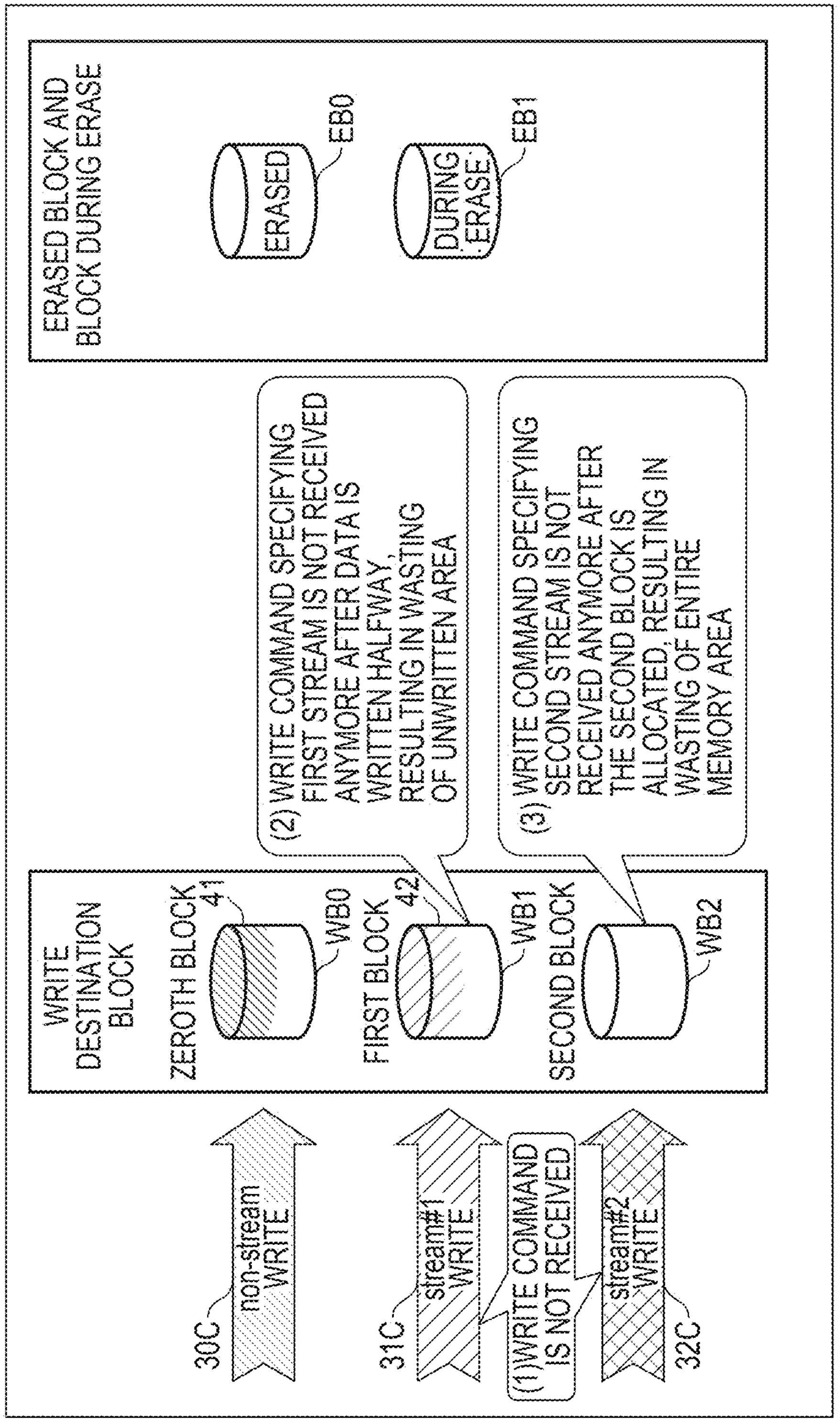
FIG. 4 is a diagram illustrating a case where a memory area of a block allocated to a stream is wasted, in the memory system according to the comparative example.

FIG. 4 illustrates a case (hereinafter, referred to as a third case) where a memory area of a block allocated to a stream is wasted, in the memory system according to the comparative example. The relationship among the non-stream 30C, the first stream 31C, the second stream 32C, the zeroth block WB0, the first block WB1, the second block WB2, the erased block EB0, and the block during erase EB1 in the third case is similar to that in the first case.

In the third case, write commands with the first stream 31C and the second stream 32C are no longer received from the host ((1) in FIG. 4). That is, the write command specifying the first stream 31C and the write command with the second stream 32C are no longer received from the host.

In this case, in the first block WB1, the write command specifying the first stream 31C is no longer received after the user data is written halfway, resulting in wasting of the memory area in which data has not been written yet ((2) in FIG. 4). In addition, in the second block WB2, the write command specifying the second stream 32C is no longer received after the second block WB2 is allocated to the second stream 32C, resulting in wasting of the entire memory area ((3) in FIG. 4).

Therefore, in the memory system of the comparative example, in the third case, a write command specifying a stream is no longer received from the host 2, resulting in wasting of the memory area in the block allocated to the stream.

As described above, in the memory system of the comparative example, the execution of a write command specifying a stream may be delayed and the memory area of a block allocated to a stream may be wasted.

In contrast, in the memory system 3 according to the present embodiment, in a case where the use of a stream is started, the controller 6 (A) allocates an erased block as the write destination block corresponding to a stream if there are two or more erased blocks, and (B) sets a general-purpose block as the write destination block corresponding to the stream if there are not two or more erased blocks. That is, the controller 6 allocates an erased block or sets a general-purpose block as the write destination block of a stream according to the number of erased blocks included in the NAND flash memory 4. This enables the controller 6 to execute a write command specifying the stream without delay regardless of whether there is an allocable erased block as the write destination block of the stream.

When the use of a stream is ended, the controller 6 changes the dedicated block allocated to the stream to a general-purpose block. This enables the controller 6 to use an unwritten area of the dedicated block allocated to the stream whose use has ended for storage of the user data, without wasting the unwritten area.

Note that the controller 6 may change from the general-purpose block to the dedicated block again in response to resuming of use of the stream after changing the dedicated block allocated to the stream to the general-purpose block. Accordingly, the controller 6 can also continuously allocate the dedicated block to the stream whose use is resumed.

The operations of the stream management unit 141, the allocation control unit 142, the erase control unit 143, and the write control unit 144 of the memory system 3 will be specifically described below with reference to FIGS. 5 to 9.

Figure 5:
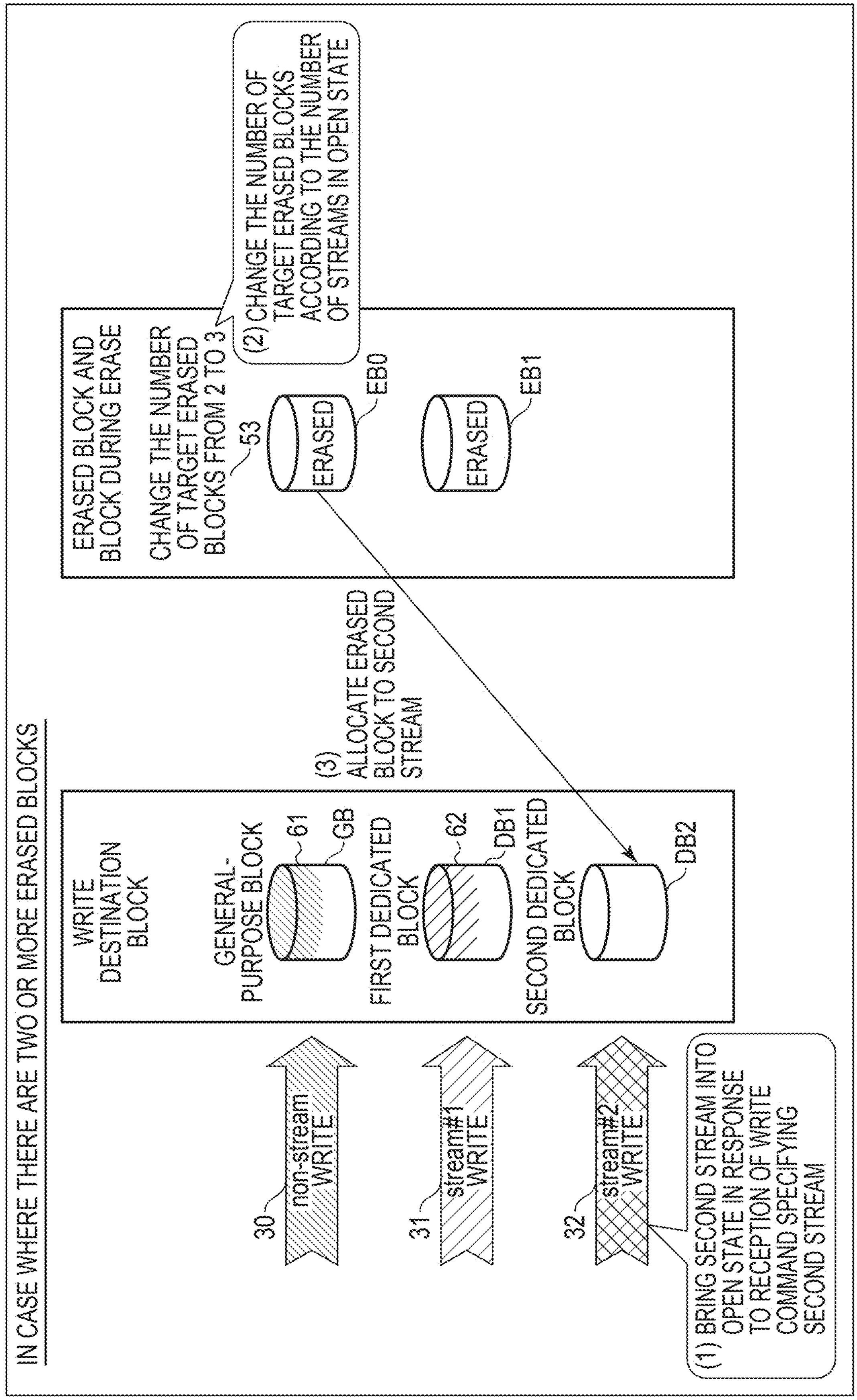
FIG. 5 is a diagram illustrating an example of an operation of allocating a dedicated block to a stream that is opened, in the memory system according to the embodiment.

FIG. 5 illustrates an example of an operation of allocating a dedicated block to a stream whose use is started (that is, a stream being brought into an open state), in the memory system 3. In the example illustrated in FIG. 5, it is assumed that a general-purpose block GB is allocated to the non-stream 30 (non-stream) and a first dedicated block DB1 is allocated to the first stream 31 (stream #1). The general-purpose block GB stores user data 61 of the non-stream 30. The first dedicated block DB1 stores user data 62 associated with the first stream 31. Since the number of streams in the open state is 1, the number of target erased blocks is, for example, 2 (=the number of streams in the open state+1). The NAND flash memory 4 includes two erased blocks EB0 and EB1.

The stream management unit 141 brings the second streams 32 into an open state in response to reception of a write command specifying the second stream 32 (stream #2) for the first time ((1) in FIG. 5).

The allocation control unit 142 changes the number of target erased blocks from 2 to 3 on the basis of the number of streams in the open state ((2) in FIG. 5). That is, the allocation control unit 142 increases the number of target erased blocks by 1 in response to the second stream 32 being brought into the open state. The erase control unit 143 starts a data erase operation for a free block in response to the number of erased blocks becoming less than the number of target erased blocks.

Next, since two or more erased blocks EB0 and EB1 are included in the NAND flash memory 4, the allocation control unit 142 allocates the erased block EB0 as a dedicated block DB2 for the second stream 32 (a second dedicated block DB2), as shown (3) in FIG. 5. This is because, even when data writing into the entire general-purpose block GB has been completed after the allocation of the erased block EB0 to the second stream 32, the erased block EB1 can be allocated as a next general-purpose block GB. The fact that the allocation control unit 142 allocates the erased block EB0 as the second dedicated block DB2 means that the second dedicated block DB2 (=the erased block EB0) is set as the write destination block dedicated to the second stream 32. Note that the allocation control unit 142 may allocate the erased block EB1 as the second dedicated block DB2. The write control unit 144 writes the associated user data into the second dedicated block DB2 according to the write command specifying the second stream 32.

As explained, in a case where the second stream 32 is brought into an open state while two or more erased blocks are included in the NAND flash memory 4, the allocation control unit 142 allocates any erased block as the second dedicated block DB2 corresponding to the second stream 32. This enables the write control unit 144 to execute the write command of the second stream 32 without delay by setting the second dedicated block DB2 as the write destination block.

Further, the allocation control unit 142 changes the number of target erased blocks according to the number of streams in the open state.

In the NAND flash memory 4, the erased block that is not used for writing data while being secured causes a reduction in memory capacity writable in the memory system 3. Therefore, securing an excessive number of erased blocks may lead to a reduction in performance of the memory system 3. The excessive number of erased blocks are, for example, erased blocks corresponding to the maximum number of streams that is manageable by the memory system 3. In this case, although the allocation of the erased blocks to the streams brought into an open state is not delayed, one or more of the erased blocks may not be actually used for writing data for a long time from when a data erase operation is completed. In such an erased block, the quality of the stored data may be deteriorated.

In the memory system 3, the allocation control unit 142 sets the number of target erased blocks according to the number of streams in the open state, so that an excessive number of erased blocks are not secured. Accordingly, the memory system 3 can secure sufficient total writable capacity even when the stream is not opened, while maintaining over provisioning (OP) capacity.

Figure 6:
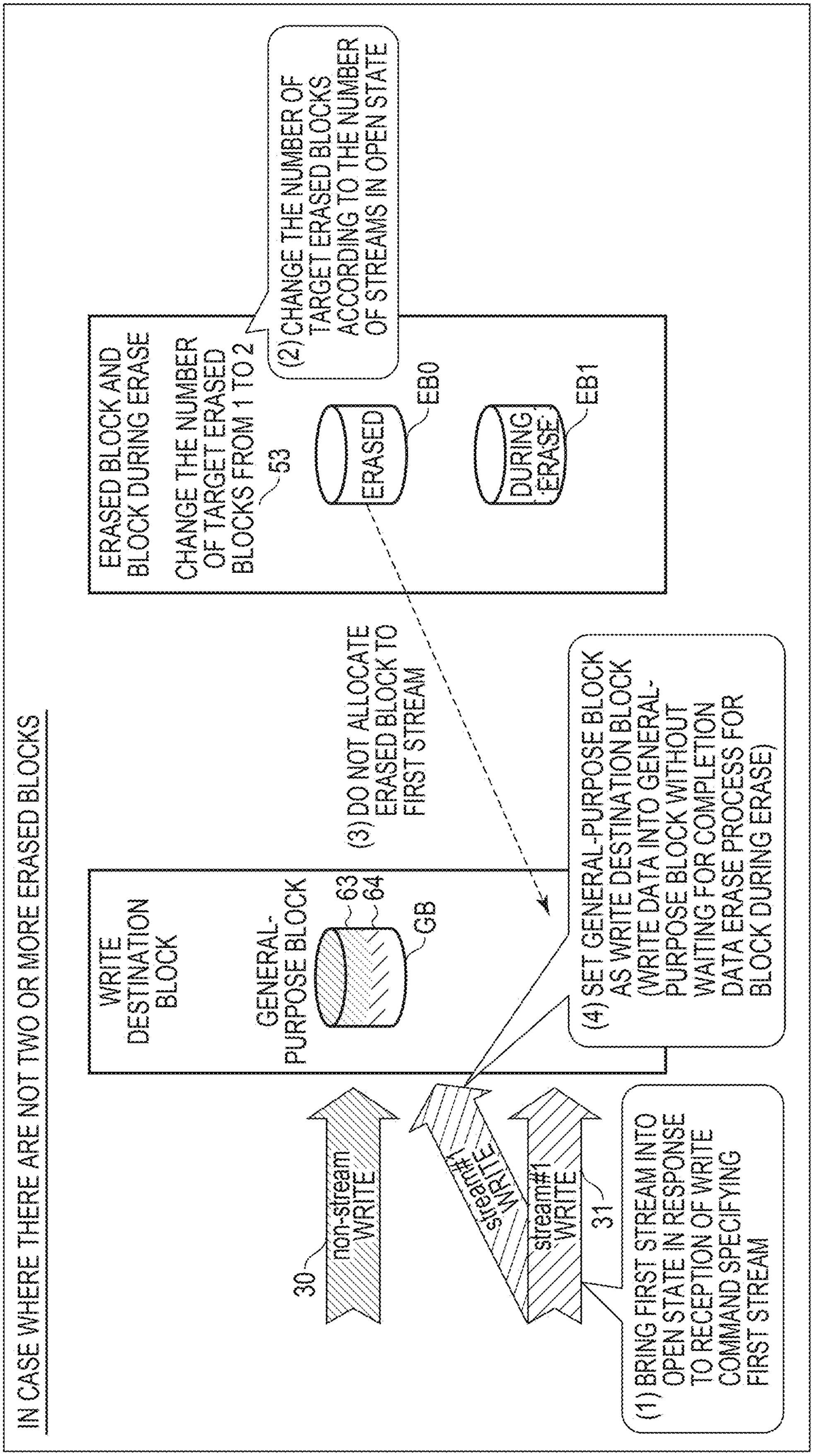
FIG. 6 is a diagram illustrating an example of an operation of setting a general-purpose block as a write destination block of a stream that is opened, in the memory system according to the embodiment.

FIG. 6 illustrates an operation of setting a general-purpose block as a write destination block of a stream that is opened, in the memory system 3. Here, it is assumed that the general-purpose block GB is allocated to the non-stream 30. The general-purpose block GB stores user data 63 of the non-stream 30. Since there is no stream in the open state, the number of target erased blocks is, for example, 1. In the NAND flash memory 4, one erased block EB0 is included.

The stream management unit 141 brings a first stream 31 into an open state in response to reception of a write command specifying the first stream 31 for the first time ((1) in FIG. 6).

The allocation control unit 142 changes the number of target erased blocks from 1 to 2 on the basis of the number of streams in the open state ((2) in FIG. 6). That is, the allocation control unit 142 increases the number of target erased blocks by 1 in response to the first stream 31 being brought into the open state. The erase control unit 143 starts a data erase operation for a free block in response to the number of erased blocks becoming less than the number of target erased blocks. Here, the free block undergoing the data erase operation is a block during erase EB1.

Since only one erased block EB0 is included in the NAND flash memory 4 (that is, there are not two or more erased blocks), the allocation control unit 142 does not allocate the erased block EB0 to the first stream 31 ((3) in FIG. 6). The allocation control unit 142 sets the general-purpose block GB as the write destination block of the first stream 31 ((4) in FIG. 6).

This enables the write control unit 144 to write user data 64 associated with the write command of the first stream 31 into the general-purpose GB without waiting for completion of the data erase operation for the block during erase EB1. Accordingly, the write control unit 144 can execute the write command of the first stream 31 without delay by setting the general-purpose block GB as the write destination block even when the erased block allocable to the first stream 31 is not included in the NAND flash memory 4.

Note that the allocation control unit 142 may change the write destination block of the stream from the general-purpose block GB to a dedicated block.

Figure 7:
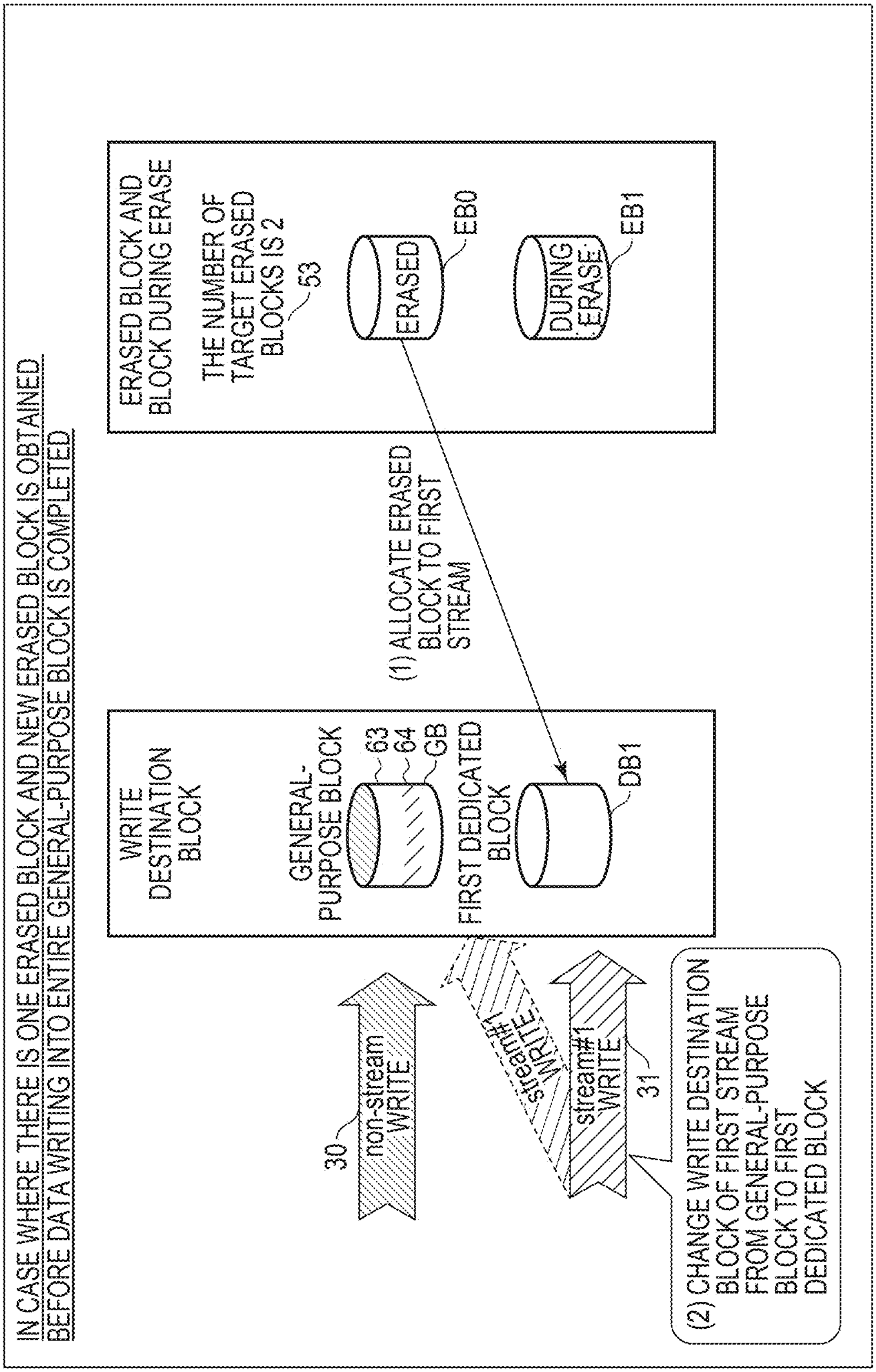
FIG. 7 is a diagram illustrating an example of an operation of changing the write destination block of the stream from the general-purpose block to a dedicated block, in the memory system according to the embodiment.

FIG. 7 illustrates an example of an operation of changing the write destination block of the first stream 31 in the example illustrated in FIG. 6 from the general-purpose block GB to a dedicated block.

After setting the general-purpose block GB as the write destination block of the first stream 31, the allocation control unit 142 predicts whether a new erased block is obtained before data writing into the entirety of the general-purpose block GB is completed. That is, the allocation control unit 142 predicts whether a data erase operation for the block during erase EB1 is completed by the erase control unit 143 before data writing into the entirety of the general-purpose block GB is completed. For this prediction, for example, the maximum data writing speed of a block in the NAND flash memory 4 and a time required for a data erase operation for one block (data erase time) are used. The maximum data writing speed is, for example, a data writing speed when the memory system 3 exhibits the writing performance based on its specifications. The maximum data writing speed may be, for example, the maximum speed of a program operation in the NAND flash memory 4. The maximum data writing speed also may be, for example, a maximum receiving speed of user data from the host 2 in the past fixed time period.

More specifically, for example, the allocation control unit 142 calculates a time (first time) at which the data writing into the entirety of the general-purpose block GB is completed on the basis of the size of an unwritten area in the general-purpose block GB (that is, a remaining memory capacity in the general-purpose block GB) and the maximum data writing speed of a block in the NAND flash memory 4. Furthermore, the allocation control unit 142 calculates a time (second time) at which the data erase operation for the block during erase EB1 is completed on the basis of a time at which the data erase operation for the block during erase EB1 is started and the data erase time for one block. In a case where the second time is earlier than the first time, the allocation control unit 142 predicts that the new erased block EB1 is obtained before the data writing into the entirety of the general-purpose block GB is completed. In a case where the second time is equal to or later than the first time, the allocation control unit 142 predicts that the new erased block EB1 cannot be obtained before the data writing into the entirety of the general-purpose block GB is completed.

When predicting that the new erased block EB1 can be obtained before the data writing into the entirety of the general-purpose block GB is completed, the allocation control unit 142 allocates the erased block EB0 as the first dedicated block DB1 corresponding to the first stream 31 ((1) in FIG. 7). Then, the allocation control unit 142 changes the write destination block of the first stream 31 from the general-purpose block GB to the first dedicated block DB1 ((2) in FIG. 7). That is, by the operations of (1) and (2) in FIG. 7, the erased block EB0 is allocated as the write destination block of the first stream 31.

This enables the write control unit 144 to not write the user data associated with the write command specifying the first stream 31 into the general-purpose block GB but to write into the first dedicated block DB1.

Note that, also in a case where the data writing into the entirety of a dedicated block allocated to a stream has been completed, the allocation control unit 142 may allocate a new erased block as the dedicated block corresponding to the stream (that is, a dedicated write destination block) or sets the general-purpose block as the write destination block of the stream, in a manner similar to operations illustrated in FIGS. 5 to 7.

Figure 8:
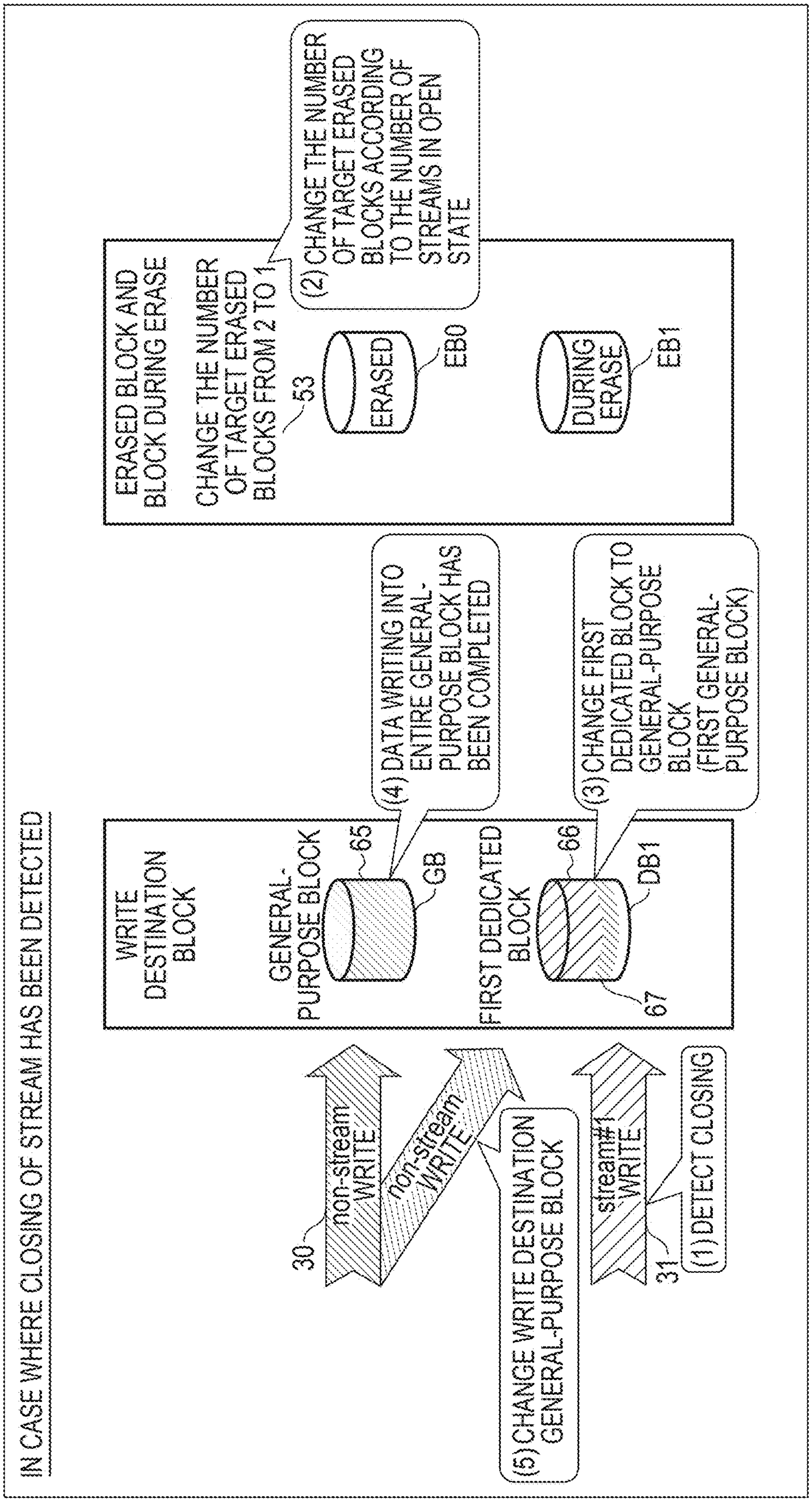
FIG. 8 is a diagram illustrating an example of an operation of using, as the general-purpose block, a dedicated block allocated to a stream that has been closed, in the memory system according to the embodiment.

FIG. 8 illustrates an example of an operation of using, as the general-purpose block, a dedicated block allocated to a stream that has been closed, in the memory system 3. Here, it is assumed that the general-purpose block GB is allocated to the non-stream 30 and the first dedicated block DB1 is allocated to the first stream 31. The general-purpose block GB stores user data 65 of the non-stream 30. The first dedicated block DB1 stores user data 66 associated with the first stream 31. Since the number of streams in the open state is 1, the number of target erased blocks is, for example, 2. In the NAND flash memory 4, two erased blocks EB0 and EB1 are included.

The stream management unit 141 detects closing of the first stream 31 ((1) in FIG. 8). The stream management unit 141 detects the closing of the first stream 31 as a result of the close command being received from the host 2 or not having received from the host 2 the write command specifying the first stream 31 for a fixed time, for example.

The allocation control unit 142 changes the number of target erased blocks from 2to 1 on the basis of the number of streams in the open state ((2) in FIG. 8). That is, the allocation control unit 142 decreases the number of target erased blocks by 1 in response to detecting the closing of the first stream 31. Then, the allocation control unit 142 changes the first dedicated block DB1 allocated to the first stream 31 to a general-purpose block ((3) in FIG. 8). The general-purpose block changed from the first dedicated block DB1 is referred to herein as a first general-purpose block DB1.

Next, the allocation control unit 142 changes a general-purpose block used as a write destination block (hereinafter, referred to as a write destination general-purpose block) from the general-purpose block GB to the first general-purpose block DB1 ((5) in FIG. 8) when the data writing into the entirety of the general-purpose block GB has been completed ((4) in FIG. 8). That is, the first dedicated block DB1 allocated to the first stream 31 whose closing has been detected is used as a new write destination general-purpose block.

This enables the write control unit 144 to write user data into the first general-purpose block DB. For example, user data 67 of the non-stream 30 and user data associated with a stream to which a dedicated block is not allocated may be written into the first general-purpose block DB1. Accordingly, the unwritten area in the first dedicated block DB1 can be used for storing user data so that the unwritten area is not wasted.

Note that in a case where the use of the first stream 31 whose closing has been detected is resumed (i.e., reopened), the allocation control unit 142 can also return the first general-purpose block DB1 to the first dedicated block DB1.

Figure 9:
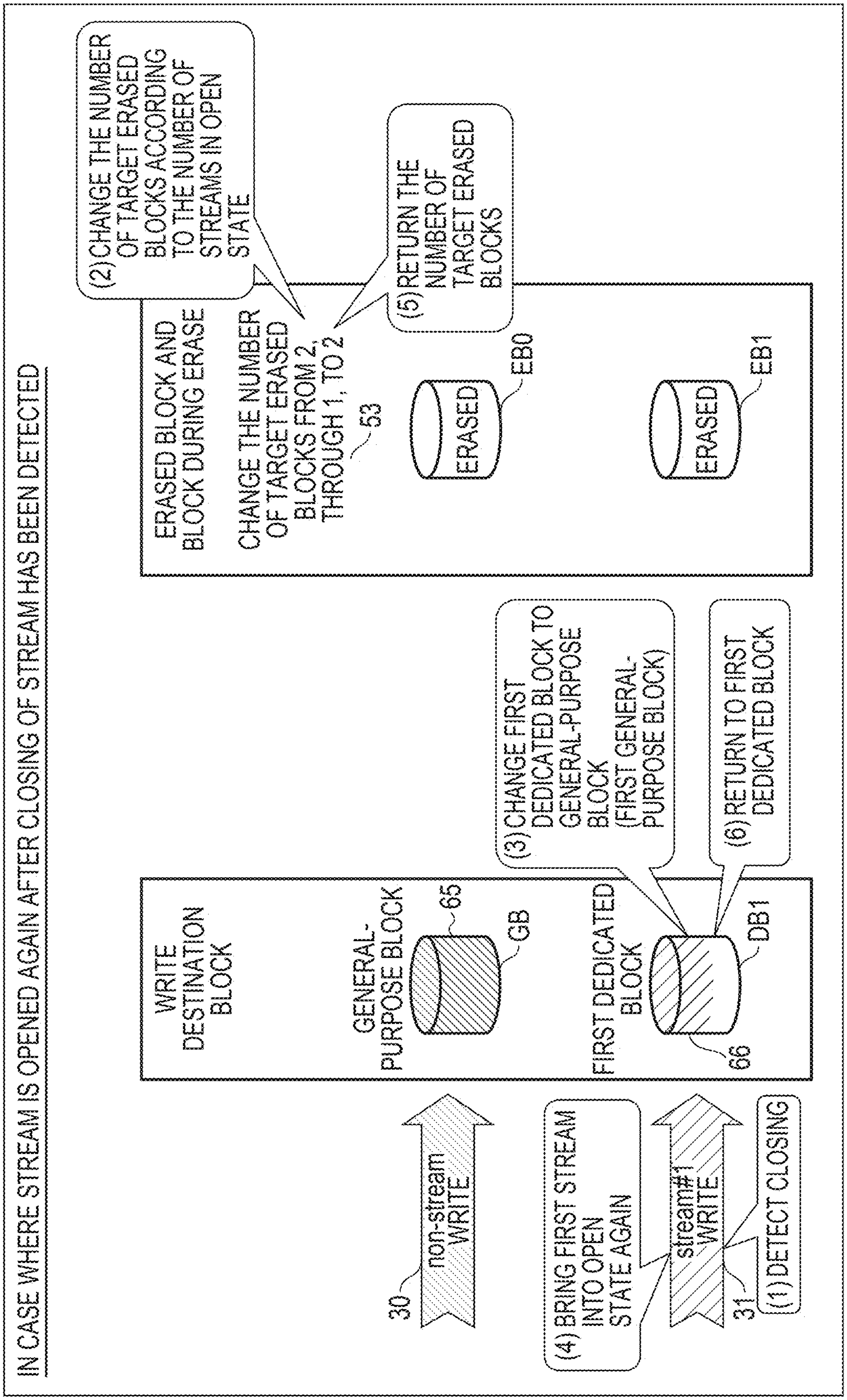
FIG. 9 is a diagram illustrates an example of an operation of changing the dedicated block allocated to the stream that has been closed to the general-purpose block and then returning it to be the dedicated block, in the memory system according to the embodiment.

FIG. 9 illustrates an example of an operation of changing the dedicated block allocated to the stream that has been closed to the general-purpose block and then returning it to be the dedicated block, in the memory system 3. The operations from (1) to (3) in FIG. 9 is similar to the operations from (1) to (3) in FIG. 8.

After the first dedicated block DB1 is changed to the first general-purpose block DB1, the stream management unit 141 brings the first stream 31 into the open state again in response to reception of a write command specifying the first stream 31 from the host 2, for example ((4) in FIG. 9).

The allocation control unit 142 returns the number of target erased blocks from 1to 2 in response to the first stream 31 being in the open state again ((5) in FIG. 9). Then, after the first dedicated block DB1 is changed to the first general-purpose block DB1, the allocation control unit 142 returns the first general-purpose block DB1 to the first dedicated block DB1 in response to the first stream 31 being brought into the open state again before user data is newly written into the first general-purpose block DB1 ((6) in FIG. 9). That is, the allocation control unit 142 allocates the first general-purpose block DB1 as the first dedicated block DB1 corresponding to the first stream 31 again.

Thus, in a case where the write command specifying the first stream 31 is received from the host 2 before the write control unit 144 newly write user data into the first general-purpose block DB1, the allocation control unit 142 returns the number of target erased blocks and the first general-purpose block DB1 to the state before closing of the first stream 31 is detected. This enables the write control unit 144 to continuously write the associated user data into the first dedicated block DB 1 in response to the write command specifying the first stream 31. Accordingly, for example, the user data associated with a plurality of write commands each specifying the first stream 31 can be stored entirely in the first dedicated block DB1.

There is a high likelihood that continuous pieces of user data are associated with a continuous plurality of write commands specifying the same stream, for example. There is a possibility that the continuous pieces of user data are unmapped at the same time. For example, in a case where all pieces of user data stored in a block are unmapped at the same time, the block becomes a free block without being subjected to the GC. Therefore, the user data associated with write commands specifying the same stream is entirely stored in the same block, which makes it possible to reduce the amount of process of changing the block to the free block.

Next, processing executed in the memory system 3 will be described with reference to FIGS. 10 to 12.

Figure 10:
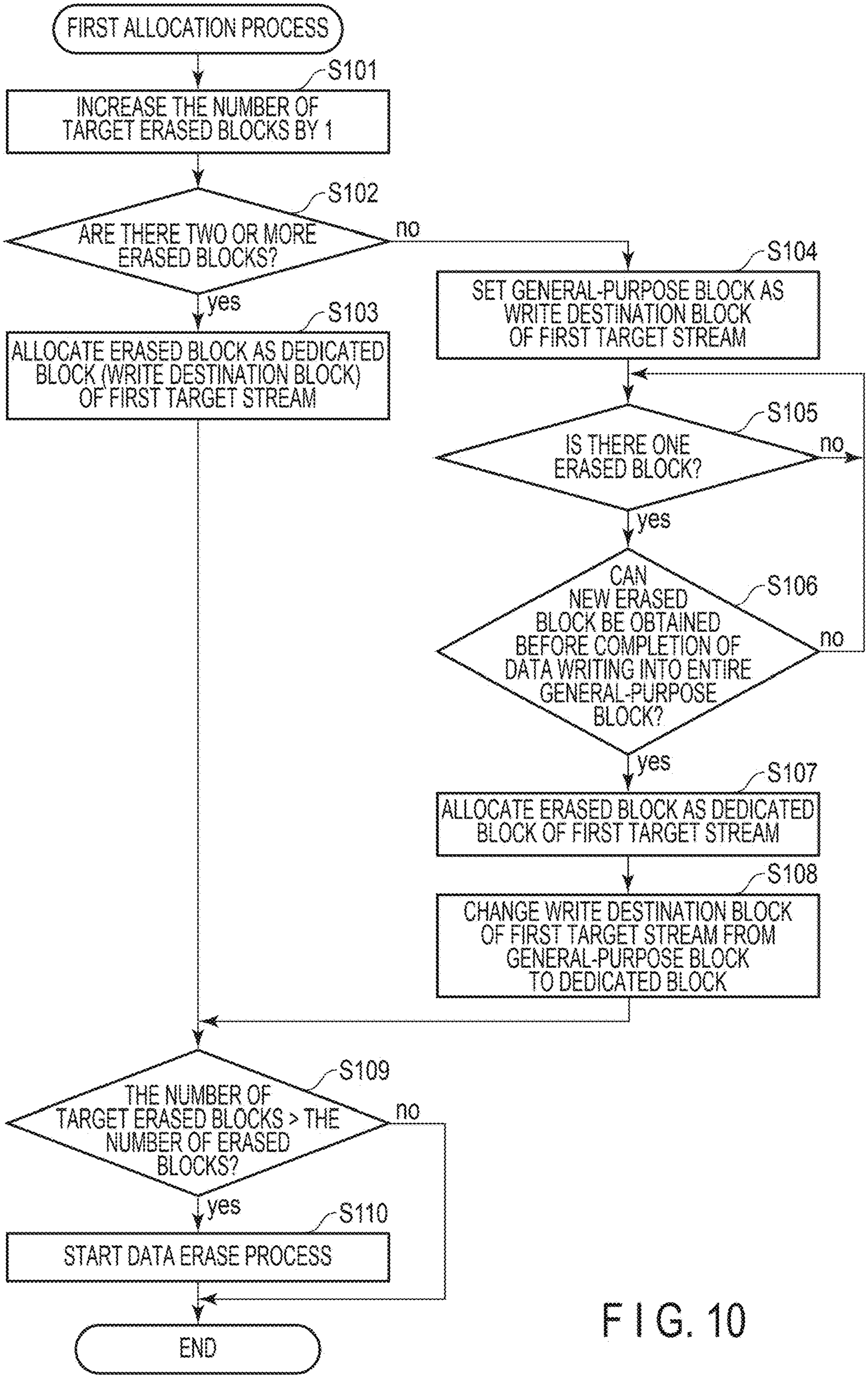
FIG. 10 is a flowchart illustrating an example of a procedure of a first allocation process executed in the memory system according to the embodiment.

FIG. 10 is a flowchart illustrating an example of a procedure of a first allocation process executed by the CPU 14. The first allocation process is a process of setting a write destination block for a stream brought into an open state. The CPU 14 executes the first allocation process in response to one stream being brought into the open state, for example. Hereafter, the stream brought into the open state is referred to herein as a first target stream.

First, the CPU 14 increases the number of target erased blocks by 1 (step S101). Next, the CPU 14 determines whether two or more erased blocks are included in the NAND flash memory 4 (step S102).

If two or more erased blocks are included in the NAND flash memory 4 (yes in step S102), the CPU 14 allocates one of the two or more erased blocks as a dedicated block of the first target stream (step S103), and the process by the CPU 14 proceeds to step S109. The dedicated block is used as a write destination block of the first target stream. That is, the user data associated with a write command specifying the first target stream is written into this dedicated block.

If two or more erased blocks are not included in the NAND flash memory 4 (no in step S102), the CPU 14 sets a general-purpose block as the write destination block of the first target stream (step S104). Thus, the user data associated with the write command specifying the first target stream is not written into a dedicated block but is written into the general-purpose block. Then, the CPU 14 determines whether one erased block is included in the NAND flash memory 4 (step S105).

If one erased block is not included in the NAND flash memory 4 (no in step S105), the process by the CPU 14 returns to step S105. That is, the process in step S105 is repeated until it is determined that there is one erased block.

If one erased block is included in the NAND flash memory 4 (yes in step S105), the CPU 14 determines whether a new erased block can be obtained before data writing into the entirety of the general-purpose block is completed (step S106). The CPU 14 determines whether the new erased block can be obtained before data writing into the entirety of the general-purpose block is completed on the basis of the maximum data writing speed of a block in the NAND flash memory 4 and the data erase time for one block, for example.

If a new erased block cannot be obtained before data writing into the entirety of the general-purpose block is completed (no in step S106), the process by the CPU 14 returns to step S105. That is, the processes in steps S105 and S106 are repeated until it is determined that there is one erased block in the NAND flash memory 4 and the new erased block can be obtained before data writing into the entirety of the general-purpose block is completed.

If a new erased block can be obtained before data writing into the entirety of the general-purpose block is completed (yes in step S106), the CPU 14 allocates the erased block as the dedicated block of the first target stream (step S107). Then, in step S108, the CPU 14 changes the write destination block of the first target stream from the general-purpose block to the dedicated block (that is, allocated erased block), and the process by the CPU 14 proceeds to step S109.

After any one of the processes in steps S103 and S108 is performed, the CPU 14 determines whether the number of target erased blocks exceeds the number of erased blocks (step S109). If the number of target erased blocks exceeds the number of erased blocks (yes in step S109), the CPU 14 selects one free block in the NAND flash memory 4 and starts a data erase process for the free block (step S110), and ends the first allocation process. On the other hand, if the number of target erased blocks is equal to or less than the number of erased blocks (no in step S109), the CPU 14 ends the first allocation process.

If, with the above-described first allocation process, two or more erased blocks are included in the NAND flash memory 4, one of the two or more erased blocks is allocated to the first target stream by the CPU 14. If two or more erased blocks are not included in the NAND flash memory 4, the CPU 14 sets a general-purpose block as the write destination block of the first target stream. Then, the CPU 14 allocates an erased block (dedicated block) to the first target stream when there is one erased block in the NAND flash memory 4 and a new erased block can be obtained before data writing into the entirety of the general-purpose block is completed. This enables the CPU 14 to execute the write command specifying the first target stream without delay regardless of whether there is an allocable erased block as the write destination blocks of the first target stream.

Note that the CPU 14 performs a process of newly setting a write destination block of the first target stream also in a case where data writing into the entirety of the dedicated block allocated to the first target stream is completed. This process is a process obtained by excluding the process in step S101 from the first allocation process, for example. Accordingly, even when data writing into the entirety of the dedicated block allocated to the first target stream is completed, the CPU 14 can execute the write command specifying the first target stream without delay regardless of whether there is a new allocable erased block as the write destination blocks of the first target stream.

Figure 11:
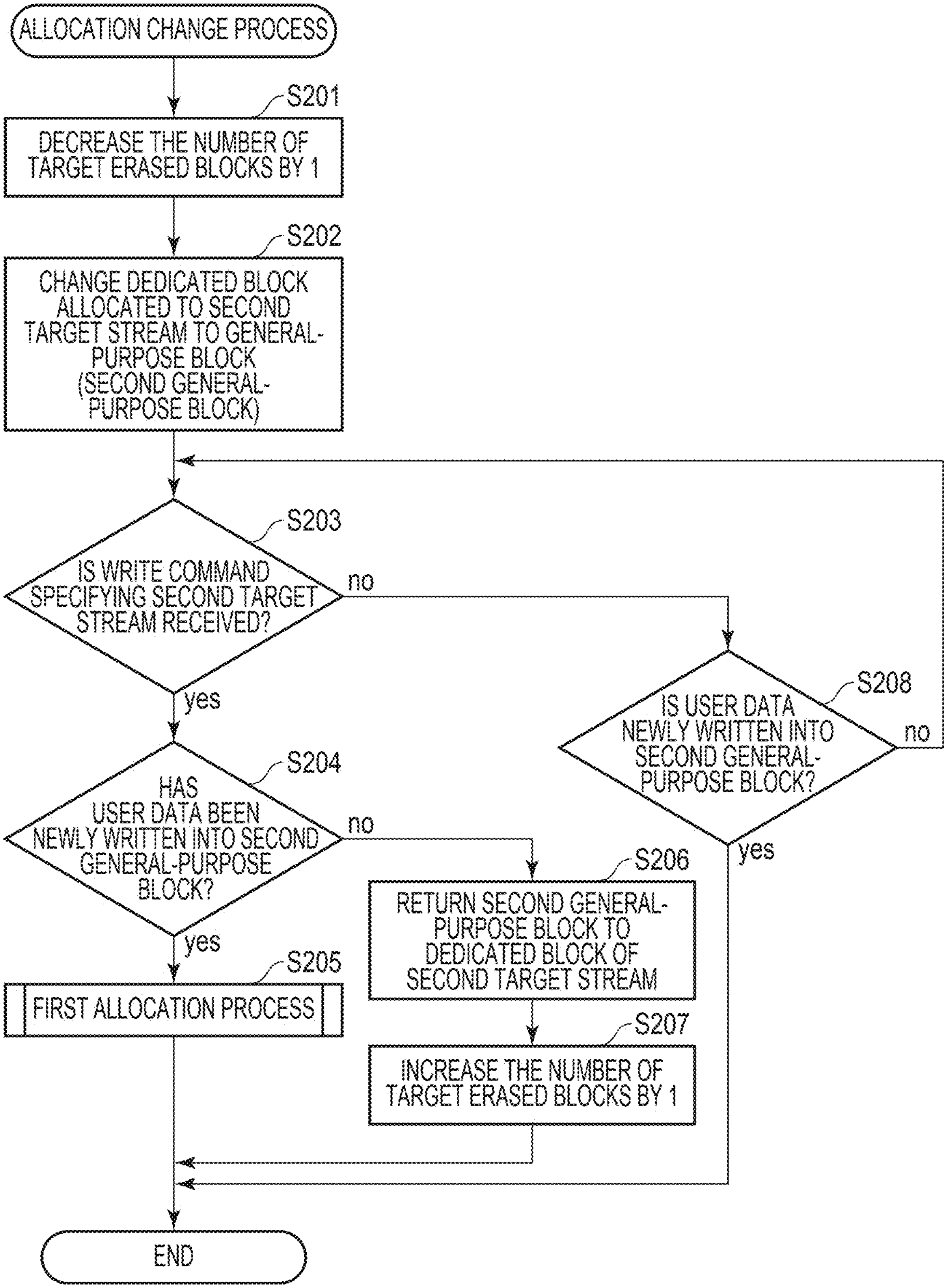
FIG. 11 is a flowchart illustrating an example of a procedure of an allocation change process executed in the memory system according to the embodiment.

FIG. 11 is a flowchart illustrating an example of a procedure of an allocation change process executed by the CPU 14. The allocation change process is a process for using a dedicated block allocated to a stream that has been closed. The CPU 14 executes the allocation change process in response to detecting the closing of one stream. Hereinafter, the stream for which the closing has been detected is referred to herein as a second target stream. It is assumed that a dedicated block is allocated to the second target stream.

First, the CPU 14 decreases the number of target erased blocks by 1 (step S201). In step 202, the CPU 14 changes the dedicated block allocated to the second target stream to a general-purpose block (hereinafter, referred to as a second general-purpose block).

Next, the CPU 14 determines whether a write command specifying the second target stream has been received (step S203). That is, the CPU 14 determines whether the write command specifying the second target stream is received again after the closing of the second target stream has been detected.

If the write command specifying the second target stream is received (yes in step S203), the CPU 14 determines whether user data has been newly written into the second general-purpose block (step S204). That is, the CPU 14 determines whether any one of the non-stream user data and the user data associated with the stream to which the dedicated block has not been allocated has been written in the second general-purpose block in step S202 and thereafter.

If the user data has been newly written into the second general-purpose block (yes in step S204), the CPU 14 executes the first allocation process for the second target stream (step S205), and ends the allocation change process. That is, since the dedicated block previously allocated to the second target stream has been already used as the general-purpose block, the CPU 14 executes the first allocation process to set a new write destination block to the second target stream. The procedure of the first allocation process has been described above with reference to FIG. 10.

If the user data has not been newly written into the second general-purpose block (no in step S204), the CPU 14 returns the second general-purpose block to be the dedicated block of the second target stream (step S206). This dedicated block is used as the write destination block of the second target stream again. Then, the CPU 14 increases the number of target erased blocks by 1 (step S207), and ends the allocation change process.

If the write command specifying the second target stream is not received (no in step S203), the CPU 14 determines whether user data is newly written into the second general-purpose block (step S208). If the user data is not newly written into the second general-purpose block (no in step S208), the process by the CPU 14 returns to step S203. That is, in a case where the write command specifying the second target stream is received after the dedicated block of the second target stream is changed to the second general-purpose block, the CPU 14 performs processes of steps S203 to S207 for resuming it to be used as the dedicated block of the second target stream.

If the user data is newly written into the second general-purpose block (yes in step S208), the CPU 14 ends the allocation change process. That is, if the user data is newly written into the second general-purpose block prior to receiving the write command specifying the second target stream, the second general-purpose block is determined to be used as a general-purpose block.

With the above-described allocation change process, the CPU 14 can use the dedicated block allocated to the closed second target stream as a general-purpose block. That is, the CPU 14 can use the unwritten memory area in the dedicated block as a memory area of the general-purpose block so that the unwritten memory area is not wasted. Furthermore, in a case where, after the dedicated block is changed to the general-purpose block, the use of the second target stream is resumed before user data is newly written into the general-purpose block, the CPU 14 returns the general-purpose block to be the dedicated block. Thus, the CPU 14 can effectively use the memory area of the block by changing the usage of the block allocated according to the usage state of the second target stream.

Figure 12:
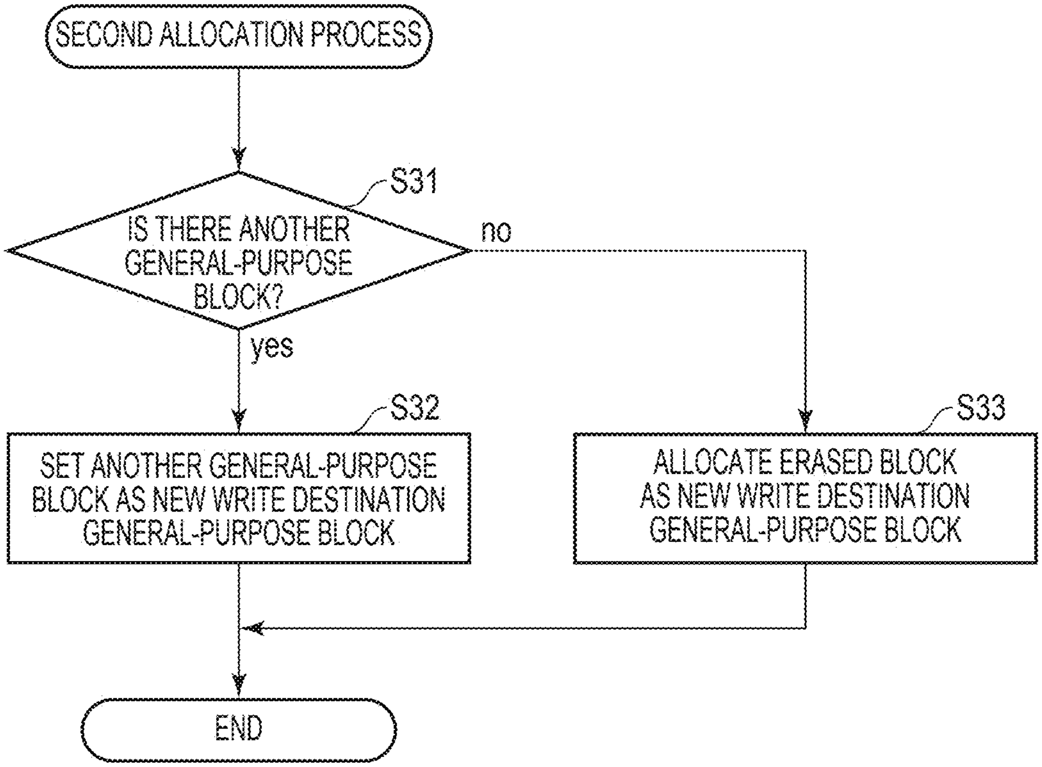
FIG. 12 is a flowchart illustrating an example of a procedure of a second allocation process executed in the memory system according to the embodiment.

FIG. 12 is a flowchart illustrating an example of a procedure of a second allocation process executed by the CPU 14. The second allocation process is a process of allocating a general-purpose block. The CPU 14 executes the second allocation process in response to completion of data writing into the entirety of a general-purpose block used as a write destination block, for example.

The CPU 14 first determines whether a general-purpose block different from the current write destination general-purpose block is included in the NAND flash memory 4 (step S31). Another general-purpose block is a general-purpose block changed from a dedicated block of a stream when closing of the stream has been detected, for example.

If another general-purpose block is included in the NAND flash memory 4 (yes in step S31), the CPU 14 sets said another general-purpose block as a new write destination general-purpose block (step S32), and ends the second allocation process.

If another general-purpose block is not included in the NAND flash memory 4 (no in step S31), the CPU 14 allocates an erased block as a new write destination general-purpose block (step S33), and ends the second allocation process.

With the above-described second allocation process, the CPU 14 can set any one of another general-purpose block and an erased block as a new write destination general-purpose block in response of completion of data writing into the entirety of the current write destination general-purpose block.

In a case where another general-purpose block is set as a write destination general-purpose block, the CPU 14 can effectively use the unwritten area in the general-purpose block changed from the dedicated block, for example.

In a case where an erased block is allocated as a write destination general-purpose block, the CPU 14 can allocate the erased block as the general-purpose block without delay. The CPU 14 secured the erased block so that it can be newly allocated as the general-purpose block, at the timing when data writing into the entirety of the general-purpose block has been completed. That is, the number of erased blocks to be newly allocated as the general-purpose blocks is sufficient at the timing when data writing into the entirety of the general-purpose block has been completed.

Accordingly, in a case where data writing into the entirety of a write destination general-purpose block has been completed, the CPU 14 can write associated user data into a new write destination general-purpose block without delay according to the non-stream write command or a write command specifying a stream to which the dedicated block is not allocated.

As described above, according to the present embodiment, the delay of a process according to a write request can be reduced. The stream management unit 141 can manage a plurality of streams. The allocation control unit 142 allocates a first erased block for which a data erase operation has been completed among the plurality of blocks included in the NAND flash memory 4, as a general-purpose block into which data not associated with any of the plurality of streams and data associated with any of the plurality of streams are writable. In a case where use of a first stream among the plurality of streams is started, if two or more erased blocks for which the data erase operation has been completed are included in the plurality of blocks, the allocation control unit 142 allocates a second erased block as a write destination block corresponding to the first stream, and if two or more erased blocks for which the data erase operation has been completed are not included in the plurality of blocks, the allocation control unit 142 sets the first erased block as the write destination block corresponding to the first stream.

This enables the write control unit 144 to write the associated user data into the write destination block, which is any of the second erased block and the first erased block (i.e., general-purpose block), according to the write request (for example, a write command specifying the first stream) received with the first stream. Accordingly, in the memory system 3 having the multi-stream function, the delay of a process according to the write request can be reduced.

Each of various functions described in the present embodiment may be executed by a circuit (e.g., a processing circuit). Examples of the processing circuit includes a programmed processor such as a central processing unit (CPU). This processor executes each of described functions by executing a computer program (instructions) stored in a memory. This processor may be a microprocessor including an electrical circuit. Examples of a processing circuit also include a digital signal processor (DSP), an application specific integrated circuit (ASIC), a microcontroller, a controller, and other electrical circuit components. Each of the other components than CPU described in the present embodiment may be also implemented with a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system that is connectable to a host, comprising:

a nonvolatile memory that includes a plurality of blocks; and a controller that is electrically connected to the nonvolatile memory, and is configured to:

manage a plurality of streams;

allocate a first erased block for which a data erase operation has been completed among the plurality of blocks, as a general-purpose block into which data not associated with any of the plurality of streams and data associated with any of the plurality of streams are writable;

in a case where use of a first stream among the plurality of streams is started, if two or more erased blocks for which the data erase operation has been completed are included in the plurality of blocks, allocate a second erased block as a write destination block corresponding to the first stream; and if two or more erased blocks for which the data erase operation has been completed are not included in the plurality of blocks, set the first erased block as the write destination block corresponding to the first stream; and allocate a third erased block as the write destination block corresponding to the first stream if, after setting the first erased block as the write destination block corresponding to the first stream, a data erase operation for the third erased block is completed before data writing into the entirety of the first erased block is completed.

2. The memory system of claim 1, wherein the controller is configured to predict whether the third erased block can be obtained before data writing into the entirety of the first erased block is completed, using a maximum data writing speed of the first erased block and a time required for completing the data erase operation for one block in the nonvolatile memory.

3. The memory system of claim 1, wherein the controller is further configured to change the third erased block allocated as the write destination block corresponding to the first stream to the general-purpose block in response to an end of the use of the first stream.

4. The memory system of claim 3, wherein the controller is further configured to allocate the third erased block as the write destination block corresponding to the first stream again when the use of the first stream is resumed after changing the third erased block to the general-purpose block and before data is newly written into the third erased block that has been changed to the general-purpose block.

5. The memory system of claim 1, wherein the controller is further configured to change the second erased block allocated as the write destination block corresponding to the first stream to the general-purpose block in response to an end of the use of the first stream.

6. The memory system of claim 5, wherein the controller is further configured to allocate the second erased block as the write destination block corresponding to the first stream again when the use of the first stream is resumed after changing the second erased block to the general-purpose block and before data is newly written into the second erased block that has been changed to the general-purpose block.

7. The memory system of claim 1, wherein the controller is further configured to:

determine a second number of erased blocks to be secured on the basis of a first number of streams being used, and perform the data erase operation for a block in which valid data is not stored among the plurality of blocks so that the second number of erased blocks is secured.

8. The memory system of claim 7, wherein the controller is further configured to:

increase the second number by 1 when the use of the first stream is started, and decrease the second number by 1 when the use of the first stream is ended.

9. The memory system of claim 1, wherein the controller is further configured to:

write data associated with a first write request not specifying any stream into the general-purpose block in response to a receipt of the first write request from the host, and write data associated with a second write request specifying the first stream to the write destination block corresponding to the first stream in response to a receipt of the second write request from the host.

10. The memory system of claim 1, wherein the controller is further configured to:

in a case where data writing into the entirety of the second erased block allocated as the write destination block corresponding to the first stream has been completed, if two or more erased blocks for which the data erase operation has been completed are included in the plurality of blocks, allocate a further erased block as the write destination block corresponding to the first stream; and if two or more erased blocks for which the data erase operation has been completed are not included in the plurality of blocks, set the first erased block as the write destination block corresponding to the first stream.

11. A method of allocating a plurality of blocks of a nonvolatile memory according to a write request received from a host, the write request specifying one or none of a plurality of streams, said method comprising:

allocating a first erased block for which a data erase operation has been completed among the plurality of blocks, as a general-purpose block into which data not associated with any of the plurality of streams and data associated with any of the plurality of streams are writable;

in a case where use of a first stream among the plurality of streams is specified in the write request received from the host, if two or more erased blocks for which the data erase operation has been completed are included in the plurality of blocks, allocating a second erased block as a write destination block corresponding to the first stream; and if two or more erased blocks for which the data erase operation has been completed are not included in the plurality of blocks, setting the first erased block as the write destination block corresponding to the first stream; and allocating a third erased block as the write destination block corresponding to the first stream if, after setting the first erased block as the write destination block corresponding to the first stream, a data erase operation for the third erased block is completed before data writing into the entirety of the first erased block is completed.

12. The method of claim 11, further comprising:

determining that the third erased block can be obtained before data writing into the entirety of the first erased block is completed, by using a maximum data writing speed of the first erased block and a time required for completing the data erase operation for one block in the nonvolatile memory.

13. The method of claim 11, further comprising:

changing the third erased block allocated as the write destination block corresponding to the first stream to the general-purpose block in response to an end of the use of the first stream.

14. The method of claim 13, further comprising:

allocating the third erased block as the write destination block corresponding to the first stream again when the use of the first stream is resumed after changing the third erased block to the general-purpose block and before data is newly written into the third erased block that has been changed to the general-purpose block.

15. The method of claim 11, further comprising:

changing the second erased block allocated as the write destination block corresponding to the first stream to the general-purpose block in response to an end of the use of the first stream.

16. The method of claim 15, further comprising:

allocating the second erased block as the write destination block corresponding to the first stream again when the use of the first stream is resumed after changing the second erased block to the general-purpose block and before data is newly written into the second erased block that has been changed to the general-purpose block.

17. The method of claim 11, further comprising:

determining a second number of erased blocks to be secured on the basis of a first number of streams being used; and performing the data erase operation for a block in which valid data is not stored among the plurality of blocks so that the second number of erased blocks is secured.

18. The method of claim 17, further comprising:

increasing the second number by 1 when the use of the first stream is started, and decreasing the second number by 1 when the use of the first stream is ended.

* * * * *